(12) United States Patent
Chen et al.

(10) Patent No.: US 11,687,134 B2
(45) Date of Patent: Jun. 27, 2023

(54) COOLING DEVICE IDENTIFICATION

(71) Applicant: QUANTA COMPUTER INC., Taoyuan (TW)

(72) Inventors: Yi-Chieh Chen, Taoyuan (TW); Yueh-Chang Wu, Taoyuan (TW); Yan-Kuei Chen, Taoyuan (TW); Hsin-Yu Lin, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 333 days.

(21) Appl. No.: 16/878,026

(22) Filed: May 19, 2020

(65) Prior Publication Data

US 2021/0365087 A1    Nov. 25, 2021

(51) Int. Cl.
*G06F 1/20* (2006.01)
(52) U.S. Cl.
CPC .................................. *G06F 1/206* (2013.01)
(58) Field of Classification Search
CPC ...................................................... G06F 1/206
See application file for complete search history.

(56) References Cited

U.S. PATENT DOCUMENTS

2016/0266560 A1* 9/2016 Chou ................... G05B 19/042
2017/0219239 A1* 8/2017 Lovicott ................. F04D 25/08
2019/0390864 A1* 12/2019 Lambert ................. F24F 11/52

\* cited by examiner

*Primary Examiner* — Tejal Gami
(74) *Attorney, Agent, or Firm* — Nixon Peabody LLP

(57) ABSTRACT

Cooling devices, such as fans, installed in a computing device can be automatically identified by reading an encoded signal from the cooling device's tachometer signal line. A cooling device can temporarily output an encoded signal in response to a trigger event, such as a power on event (e.g., powering-on of the cooling device). A controller, such as a baseboard management controller (BMC), can receive the encoded signal and decode the signal to determine identification information about the cooling device, such as vendor information and/or model information. The identification information about the cooling device can be stored, logged, output, and/or used to customize the operation of the cooling device.

17 Claims, 5 Drawing Sheets

COOLING DEVICE IDENTIFICATION

TECHNICAL FIELD

The present disclosure relates to computing system generally, and more specifically to cooling systems for computing systems, such as fans.

BACKGROUND

In computing systems, such as servers in datacenters, active cooling is important to keep the components of the computing system sufficiently cooled during operation. Since high-performance equipment (e.g., central processing units (CPUs), graphic processing units (GPUs), network interface cards (NICs), and the like) often generates large amounts of heat during operation, they must be appropriately cooled to ensure continued operation. Cooling devices, such as fans, can be sourced from various different vendors, and each vendor's devices may operate slightly differently depending on the manufacturing techniques and materials used. For example, a fan from a first vendor may operate at a slightly different rotational speed when driven at the same pulse with modulation (PWM) signal as a similar fan from a different vendor. Additionally, different cooling devices may have different costs, have different expected lifespans, have different warranties, and other differences.

During manufacture, a computing system may have certain cooling devices installed by the original manufacturer. However, as the cooling devices wear and fail over time, they must be replaced. Computer administrators may replace the cooling devices with new cooling devices from the same or different vendors. There is a need to automatically track cooling devices that are installed on computing systems.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include methods and systems for performing methods for identifying a cooling device (e.g., a fan) of a computing system. The cooling device comprises a rotatable component and a tachometer signal line for reporting information associated with the speed of rotation of the rotatable component. The method can comprise supplying power to the cooling device; receiving an encoded signal from the cooling device via a tachometer signal line; and obtaining cooling device identification information based on the received encoded signal.

In some cases, receiving the encoded signal from the cooling device via the tachometer signal line occurs for a preset duration. The method further comprises receiving tachometer data via the tachometer signal line after expiration of the preset duration, wherein the tachometer data is based on the speed of rotation of the rotatable component. In some cases, the encoded signal comprises false tachometer data that is not based on the speed of rotation of the rotatable component. In some cases, obtaining cooling device identification information based on the received encoded signal comprises accessing an encoding schema, and determining the cooling device identification information by decoding the encoded signal using the encoding schema. In some cases, the method further comprises adjusting one or more settings associated with operation of the cooling device based on the cooling device identification information. In some cases, the method further comprises transmitting a trigger signal to the cooling device, wherein the trigger signal, when received by the cooling device, initiates transmission of the encoded signal. In some cases, the cooling device identification information comprises vendor identification of the cooling device.

Embodiments of the present disclosure also include methods and systems for performing methods for outputting an encoded signal by a cooling device comprising a rotatable component and a tachometer signal line for reporting information associated with the speed of rotation of the rotatable component. The method can comprise receiving power at a cooling device of a computing system and outputting an encoded signal via the tachometer signal line, wherein the encoded signal, when received, is decodable to determine identification information associated with the cooling device.

In some cases, outputting the encoded signal via the tachometer signal line occurs for a preset duration. The method further comprises outputting tachometer data via the tachometer signal line after expiration of the preset duration, wherein the tachometer data is based on the speed of rotation of the rotatable component. In some cases, the encoded signal comprises false tachometer data that is not based on the speed of rotation of the rotatable component. In some cases, the encoded signal is associated with a preset encoding schema such that the encoded signal is decodable using the preset encoding schema to determine the identification information associated with the cooling device. In some cases, the method further comprises receiving a trigger signal, wherein outputting the encoded signal occurs in response to receiving the trigger signal. In some cases, the identification information associated with the cooling device comprises vendor identification of the cooling device.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
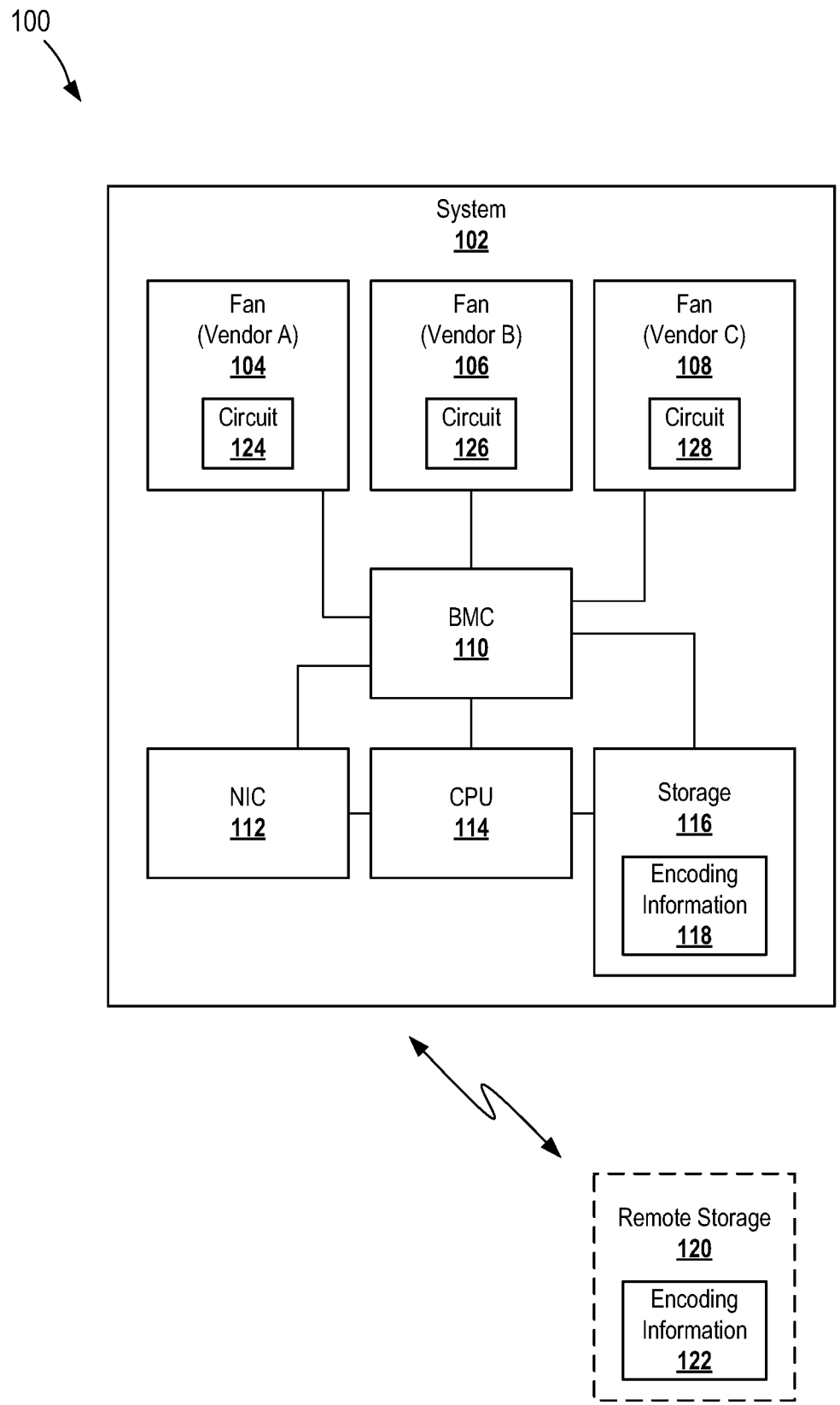
FIG. 1 is block diagram of a computing system, according to certain aspects of the present disclosure.

Certain aspects and features of the present disclosure relate to the automatic identification of cooling devices, such as fans, installed in a computing device by reading an encoded signal from the cooling device's tachometer signal line. A cooling device can temporarily output an encoded signal in response to a trigger event, such as a power on event (e.g., powering on of the cooling device). A controller, such as a baseboard management controller (BMC), can receive the encoded signal and decode the signal to determine identification information about the cooling device, such as vendor information and/or model information. In some cases, receiving and/or decoding the signal can occur in other parts of the computer hardware, such as other processors (e.g., a central processing unit, or CPU). The identification information about the cooling device can be stored, logged, output, and/or used to customize the operation of the cooling device.

Certain aspects of the present disclosure are described herein with reference to computer fans. However, where appropriate, aspects and features of the disclosure can be applied to any cooling devices having rotatable components, such as pumps or other fluid-moving devices. Further, certain aspects and features of the present disclosure relate to receiving and/or sending encoded signals along a tachometer signal line of a cooling device. However, where appropriate, aspects and features of the disclosure can be applied to any signal lines used to report information about the state of the cooling device.

Many computing devices make use of cooling devices, such as fans, to provide adequate cooling to the computing device's components. These fans are generally driven using a PWM signal, which is designed to achieve a certain rotational speed. However, each fan vendor, and in some cases each model of fan, can make use of unique bearings, blade designs, frame designs, and other functional aspects of the fan, which can result in different performance between multiple fans being driven using identical PWM signals. To accommodate the use of multiple fan vendors and/or multiple fan models in a single system, administrators may desire to know the vendor and/or model of the fan installed in the system.

Certain aspects and features of the present disclosure relate to the automatic detection of identification information of a cooling device installed in a computing system. This identification information can include information regarding a cooling device's vendor, model, or other information. This identification information can be used for various purposes, such as to keep track of inventory and backup stock; to keep track of warranty periods; to keep track of expected failure rates; to update maintenance schedules; to improve estimated cooling performance of the system; to model the cooling performance of the system; to update settings associated with control of the cooling device (e.g., to drive the cooling device using a modified PWM signal; to alter the voltage and/or current supplied to the cooling device; or to modify an algorithm used to control the cooling device); or for other purposes.

The automatic detection of identification information of a cooling device as disclosed herein can be achieved without the need to incorporate additional signal lines (e.g., additional pins) connecting each cooling device to the computing system. The automatic detection of identification information of a cooling device as disclosed herein can be achieved without the need to incorporate additional controllers or processing devices into the cooling devices, thus avoiding substantially increasing the complexity and cost of each cooling device. Instead, certain aspects and features of the present disclosure permit identification information to be automatically detected using an existing signal line (e.g., a tachometer signal line), and either existing hardware or minimally complex additional hardware within the cooling device itself.

A fan can include a tachometer signal line for outputting information about the speed of a rotating component (e.g., fan axle) of the fan. Under normal operation, the tachometer signal line outputs a signal based on the speed of rotation. In some cases, a fan can include a hall sensor that is triggered by one or more magnets embedded in the fan's rotor hub. The hall sensor can be used to generate a tachometer data signal that is output via the tachometer signal line. In some cases, the tachometer data signal can include two pulses per revolution of the rotating component. Thus, by counting the number of pulses in the tachometer data signal per unit of time, a speed of the fan can be determined.

As disclosed herein, a fan can include circuitry to generate an encoded signal and output it via the tachometer signal line. This encoded signal can be factory-set or otherwise preset based on whatever identification information is desired to be conveyed. For example, each fan vendor can be associated with a unique encoded signal that is to be output by all compatible fans produced by that vendor. The encoded signal can be a false tachometer signal. The encoded signal can be output for a preset duration of time, which can commence upon supplying power to the fan or upon receipt of some trigger signal (e.g., a specific pattern or signal sent in the PWM signal). After the encoded signal is output for the preset duration, the fan can begin or revert to transmitting the actual tachometer data signals via the tachometer signal line. In an example, a first encoded signal can comprise repeatedly alternating between an indication of 10,000 RPM and 7,000 RPM for the duration of time, whereas a second encoded signal can comprise a steady indication of 7,000 RPM for the entire duration of time. In some cases, the duration of time during which the fan is transmitting an encoded signal via the tachometer signal line can be known as the broadcasting phase, whereas the time during which the fan is reporting an actual speed of a component (e.g., rotor) can be known as the reporting phase.

The duration of the broadcasting phase can be any suitable length of time, such as at or approximately 1 second, 2 seconds, 3 seconds, 4 seconds, 5 seconds, 10 seconds, 15 seconds, 20 seconds, 25 seconds, 30 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 155 seconds, 160 seconds, 165 seconds, 170 seconds, 175 seconds, 180 seconds, 185 seconds, 190 seconds, 195 seconds, and/or 200 seconds.

A controller (e.g., a BMC or other controller) can be coupled to the fan to receive signals via the tachometer signal line. During the broadcasting phase, the controller will receive the encoded signal through the tachometer signal line. During the reporting phase or when a non-compliant fan is coupled to the controller, the controller will receive tachometer data through the tachometer signal line. The received signals from the tachometer signal line can be processed by the controller or any other data processor or combination of data processors, such as a central processing unit (CPU).

When a signal is being received from a tachometer signal line, a determination can be made as to whether or not the signal is an encoded signal. This determination can involve looking for expected variations and/or changes to the reported speed that would not be present if a true reporting of fan speed was being represented in the signal. For example, a speed that is completely steady (e.g., having a variation below a threshold amount) can be indicative that the signal is an encoded signal, since a true reporting of fan speed would have minor variations (e.g., variations greater than the threshold amount). As another example, a speed that repeatedly changes between significantly different reported speeds (e.g., rapidly changing between 10,000 RPM and 7,000 RPM) can be indicative that the signal is an encoded signal, since a true reporting of fan speed would be unable to achieve such repeated changes. In some cases, other factors of the signal can be indicative that the signal is an encoded signal, such as a change of at least a threshold amount (e.g., at or greater than 500 RPM, 1,000 RPM, 1,500 RPM, 2,000 RPM, 2,500 RPM, 3,000 RPM, 3,500 RPM, 4,000 RPM, 4,500 RPM, or 5,00 RPM) within a brief duration of time (e.g., within 0.5, 1, 2, 3, 4, or 5 seconds).

In some cases, the fan speed will be displayed and/or output to other components of the computing system, such as through an Intelligent Platform Management Interface (IPMI). In order to avoid confusion when an encoded signal is received, no speed signal or an artificial speed signal can be used for such purposes during the broadcasting phase. For example, while a fan is in a broadcasting phase and transmitting an encoded signal that varies between 7,000 RPM and 10,000 RPM, a controller or processor can receive that encoded signal and use it to determine the identifying information while also relaying either no speed signal or an artificial speed signal (e.g., set to 7,000 RPM) to other components. Thus, while the signal passed along the tachometer signal line may be switching between 7,000 RPM and 10,000 RPM, the IPMI may show no information about the fan speed or may show a constant 7,000 RPM fan speed.

When an encoded signal is received, the encoded signal can be decoded to determine information about the fan. In some cases, the encoded signal can be decoded based on an encoding schema. The encoding schema can be a known protocol or database of information used to determine identifying information based on an encoded signal. In an example, an encoded signal that repeatedly switches between 7,000 RPM and 10,000 RPM can be indicated in the encoding schema as coming from a first vendor, whereas an encoding signal that maintains a steady 7,000 RPM signal can be indicated in the encoding schema as coming from a second vendor. In some cases, the encoding schema can be stored in the computing system, however that need not always be the case. In some cases, the encoding schema can be accessed remotely, such as to facilitate updating the encoding schema. In some cases, decoding an encoded signal can comprise comparing an encoding signal to entries in a database to identify a matching entry, then retrieving the identifying information associated with that matching entry in the database.

When identification information is obtained, the identification information can be used for many different purposes. In some cases, the identification information can be stored and/or logged, such as in a memory of the computing device or in memory of a remote computing device. In some cases, the identification information can be transmitted or otherwise displayed, such as being presented on a display viewable to an administrator of the computing system. In some cases, the identification information can be used to alter the operation of the fan, such as to alter one or more settings associated with fan operation.

In some cases, the encoded signal can additionally encode supplemental data, such as numbers or alphanumeric characters. In such cases, time-changes in the reported speed on the tachometer signal line can be used to encode such supplemental data. In some cases, this supplemental data, when decoded, can be stored, logged, displayed, transmitted, or otherwise used, such as to alter operation of the fan.

In some cases, the fan can enter a broadcasting phase immediately or in response to a trigger signal. In one example, immediately after, shortly after, or after a predetermined delay from the fan receiving power, the fan can enter its broadcasting phase. In another example, the fan can remain in its reporting phase until receiving a trigger signal from a controller coupled to the fan. The trigger signal can be a recognizable pattern of driving the fan. For example, the trigger signal can be a pattern of driving the fan, such as a pattern in the PWM signal being sent to and received by the fan that can be recognizable as a trigger signal.

These illustrative examples are given to introduce the reader to the general subject matter discussed here and are not intended to limit the scope of the disclosed concepts. The following sections describe various additional features and examples with reference to the drawings in which like numerals indicate like elements. Directional descriptions are used to describe the illustrative embodiments but, like the illustrative embodiments, should not be used to limit the present disclosure. The elements included in the illustrations herein may not be drawn to scale.

FIG. 1 is block diagram of a computing system 102, according to certain aspects of the present disclosure. The computing system 102 can be part of a computing environment 100. The system 102 can be a computer, a computer server, a multi-server computer chassis, or other computing device.

The system 102 can include one or more fans, such as fan 104, fan 106, and fan 108. Each fan can include respective circuitry (e.g., circuit 124 for fan 104, circuit 126 for fan 106, and circuit 128 for fan 108) that enable to fans 104, 106, 108 to output an appropriate signal during a broadcasting phase, as described herein. In the example depicted in FIG. 1, each fan 104, 106, 108 can be associated with a different vendor, such as Vendor A, Vendor B, and Vendor C, respectively, although any combination of one or more vendors can be used. A controller, such as a BMC 110 can be coupled to the fans 104, 106, 108 to provide control and receive sensor signals (e.g., tachometer signals).

The controller (e.g., BMC 110) can be coupled to other equipment of the computing system 102, such as a computer processing unit (CPU) 114 and optionally a network interface card (NIC) 112 and/or a storage device 116. The CPU 114 can be coupled to the NIC 112 and the storage device 116. In some cases, the computing environment 100 can include a remote storage device 120, which can be any suitable storage device communicatively coupled to the BMC 110 and/or CPU 114 via a remote connection, such as a via a network connection (e.g., a local area network, a wide area network, a cloud environment, or the like).

During operation, the fans 104, 106, 108 can output an encoded signal during a broadcasting phase that is received by the BMC 110 and/or CPU 114. The encoded signal can be decoded by the BMC 110 and/or CPU 114. In some cases, the BMC 110 and/or CPU 114 can access encoding information 118 or encoding information 122 to decode the encoded signal. Encoding information 118 can be stored locally on storage device 116. Encoding information 122 can be stored remotely on remote storage device 120.

In some cases, a computing environment 100 can include other equipment and other connections than those depicted in FIG. 1. While the fans 104, 106, 108 are depicted as having different vendors, the fans 104, 106, 108 can have other differences that may be identifiable by the encoded signal.

Figure 2:
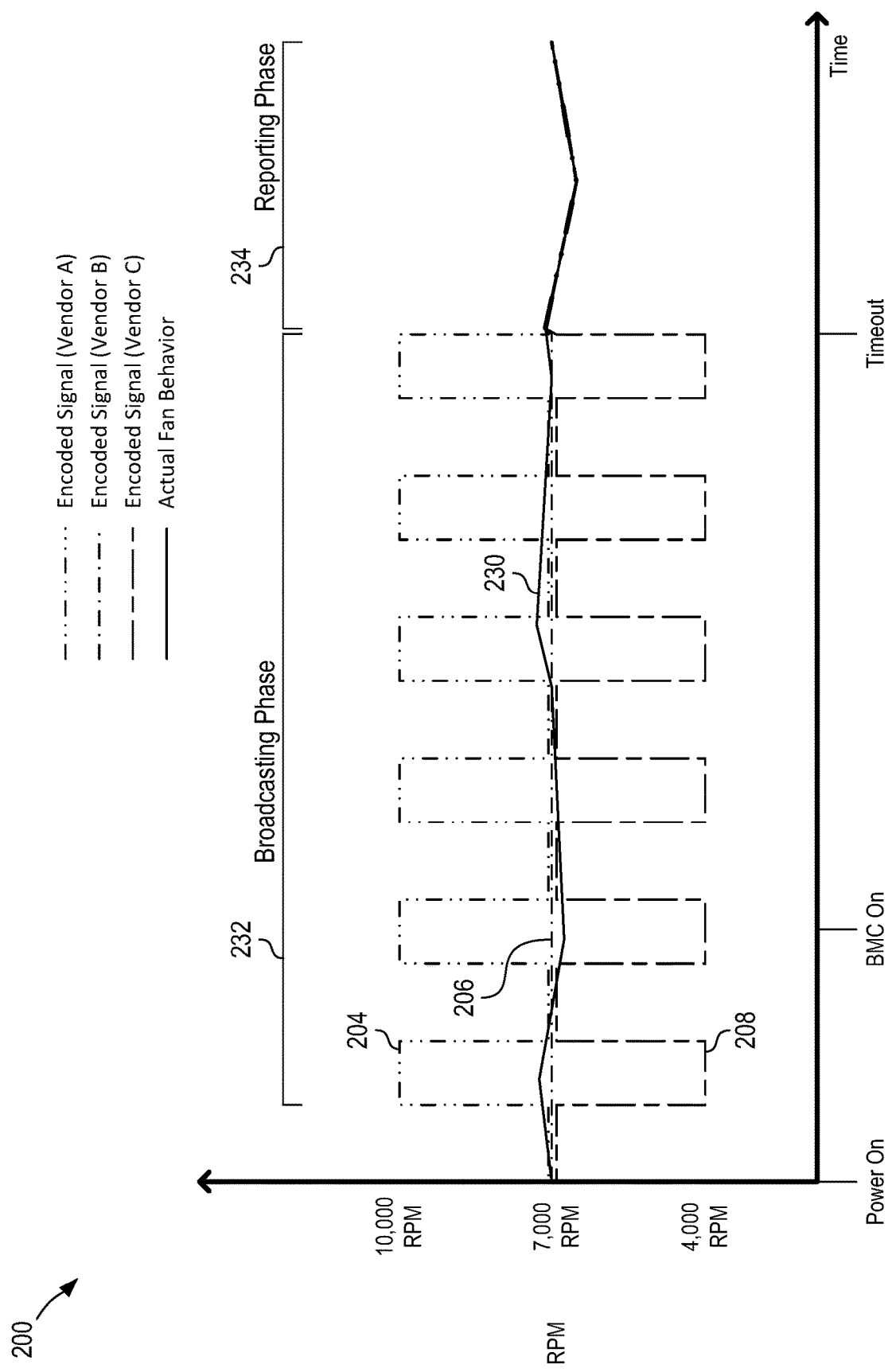
FIG. 2 is a chart depicting fan speeds and fan signals over time, according to certain aspects of the present disclosure.

FIG. 2 is a chart 200 depicting fan speeds and fan signals over time, according to certain aspects of the present disclosure. The chart 200 shows time on the X-axis and revolutions per minute (RPM) on the Y-axis. Lines 204, 206, 208 depict output signals, as reported by three fans from different vendors, such as fans 104, 106, 108 of FIG. 1. Line 230 depicts actual fan behavior, not an output signal, of one or more of the fans associated with lines 204, 206, 208. For example, while a fan may be operating at approximately 7,000 RPM, it may be reporting any one of the encoded signals on lines 204, 206, 208. It can be seen that even a fan operating at 7,000 RPM may have slight variations in speed. Thus, an output signal that is completely steady (e.g., line 206) can be identified as an encoded signal because it does not include any of the expected slight variations in speed.

Lines 204, 206, 208 depict that the output signals from the three different fans include encoded signals during a broadcasting phase 232, but revert to reporting the actual fan behavior during a reporting phase 234. For illustrative purposes, the chart 200 in FIG. 2 depicts the broadcasting phase 232 beginning shortly after a Power-On time (e.g., a time when the fans begin receiving power). However, the broadcasting phase 232 can begin in response to a specific trigger event instead of simply beginning in response to power being supplied to the fans. The broadcasting phase 232 can extend for a certain duration up to a Timeout time. It may be useful to provide a sufficiently long broadcasting phase 232 to ensure the encoded signal can be correctly received. Additionally, it may be useful to provide a sufficiently long broadcasting phase 232 after a Power-On time to permit the controller or BMC sufficient time to power on fully and begin receiving, and optionally decoding, the encoded signal. As depicted in FIG. 2, a BMC On time may be located sometime between the Power-On time and the Timeout time. The BMC On time can be associated with the BMC fully powering-on, or at least powering-on sufficiently to receive an encoded signal from a fan.

Line 204 depicts a fan operating at approximately 7,000 RPM, but providing an encoded signal during the broadcasting phase 232 that varies between 10,000 RPM and approximately 7,000 RPM throughout the broadcasting phase 232. When the encoded signal from line 204 is received, the signal can be decoded, and the fan associated with the encoded signal from line 204 can be identified as being associated with Vendor A. During the reporting phase 234, line 204 can report the actual speed of the fan associated with line 204.

Line 206 depicts a fan operating at approximately 7,000 RPM, but providing an encoded signal during the broadcasting phase 232 that remains steadily at 7,000 RPM throughout the broadcasting phase 232. When the encoded signal from line 206 is received, the signal can be decoded, and the fan associated with the encoded signal from line 206 can be identified as being associated with Vendor B. During the reporting phase 234, line 206 can report the actual speed of the fan associated with line 206.

Line 208 depicts a fan operating at approximately 7,000 RPM, but providing an encoded signal during the broadcasting phase 232 that varies between 4,000 RPM and approximately 7,000 RPM throughout the broadcasting phase 232. When the encoded signal from line 208 is received, the signal can be decoded and the fan associated with the encoded signal from line 208 can be identified as being associated with Vendor C. During the reporting phase 234, line 208 can report the actual speed of the fan associated with line 208.

While lines 204, 206, 208 are depicted as being associated with different vendors, other identifiable differences between fans can be used instead of different vendors.

Figure 3:
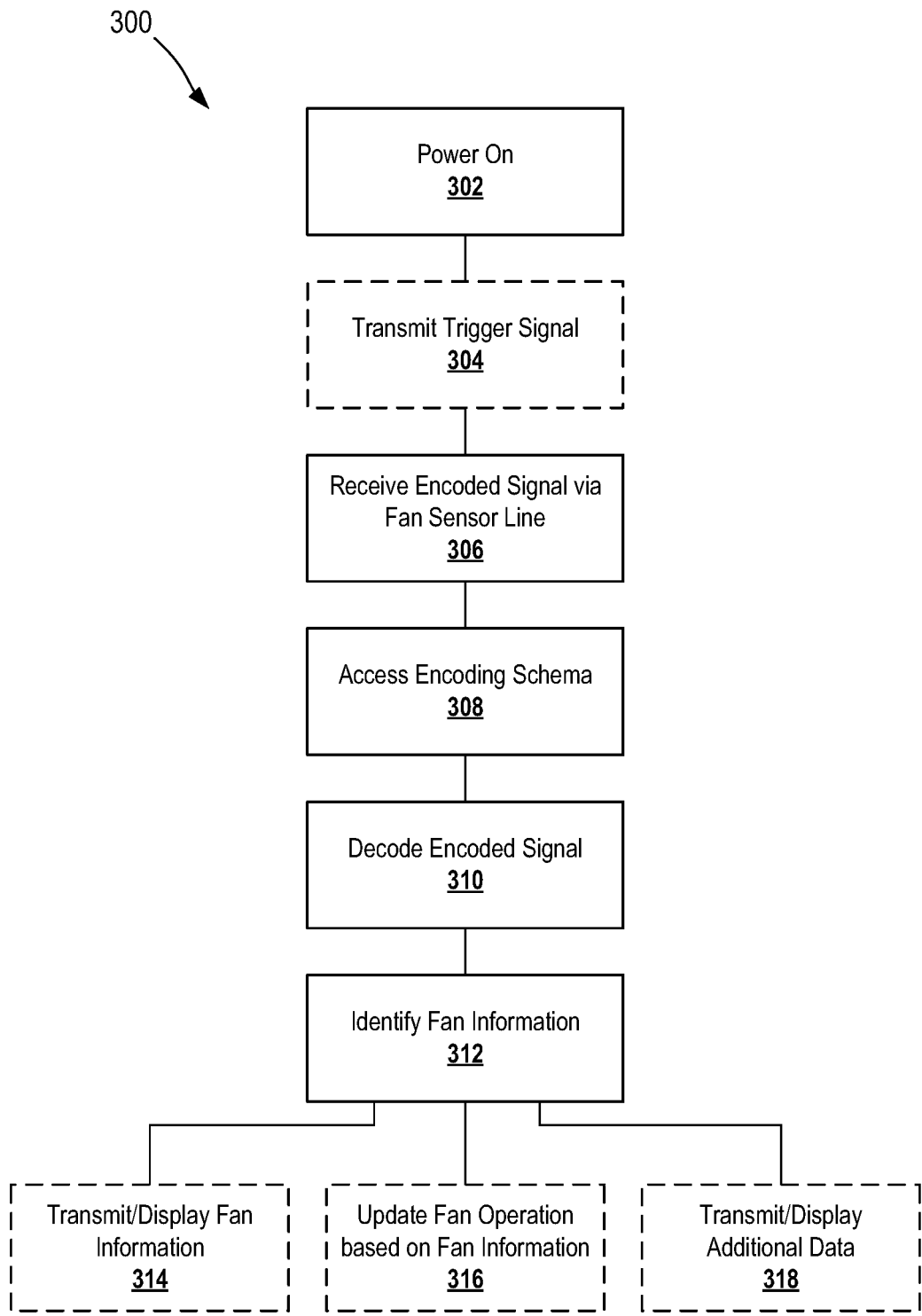
FIG. 3 is a flowchart depicting a process for automatically identifying fan information, according to certain aspects of the present disclosure.

FIG. 3 is a flowchart depicting a process 300 for automatically identifying fan information, according to certain aspects of the present disclosure. Process 300 can be performed by one or more data processors, such as a controller (e.g., BMC) or a CPU. Process 300 can be performed on a computing system having one or more data processors and one or more fans, such as computing system 102 of FIG. 1.

At block 302, power can be supplied to the one or more data processors and one or more fans of the system. In some cases, supplying power to a fan can cause the fan to start sending an encoded signal via the fan sensor line. In some cases, the one or more data processors can optionally transmit a trigger signal at 304, such as via a PWM control line, to one or more fans.

At block 306, an encoded signal can be received via a fan sensor line for each fan. The encoded signal can be similar to encoded signals depicted during the broadcasting phase 232 depicted in FIG. 2. Receiving the encoded signal can optionally include transmitting the encoded signal to one or more other data processors. At block 308, an encoding schema can be accessed. The encoding schema can be any information usable to decode the encoded signal. In some cases, accessing the encoded schema can include accessing a memory associated with the one or more data processors, such as a local memory (e.g., storage device 116 of FIG. 1). In some cases, accessing the encoded schema can include accessing a memory remotely accessible to the one or more data processors, such as a remote memory (e.g., remote storage device 120 of FIG. 1).

At block 310, the encoded signal can be decoded. Decoding the encoded signal can include identifying one or more pieces of information associated with the encoded signal using the encoding schema. In an example, the encoding schema can include a table of entries, in which each entry comprising a detectable encoding and fan information. In this example, decoding the encoded signal can comprise matching the encoded signal with the detectable encoding, and then identifying the associated fan information. In some cases, an encoded signal can be further decoded to extract additional data. The additional data can be thus transmitted from the fan to the one or more data processors via the encoded signal. This additional data can be used as appropriate, such as described below with reference to block 318.

At block 312, fan information can be identified. Identifying the fan information at block 312 can be part of decoding the encoded signal at block 130, or separate from the decoding process. In some cases, identifying fan information can include identifying a vendor associated with the fan (e.g., the fan from which the encoded signal was received at block 306). In some cases, identifying fan information can include identifying other information associated with the fan, such as a fan model, fan specifications, fan control information, desired settings, and/or any other suitable information.

At optional block 314, the fan information identified at block 312 can be transmitted and/or displayed. For example, the fan information can be transmitted to a remote server and/or a local or remote storage device. In some cases, the fan information can be displayed, such as on an IPMI display.

At optional block 316, the fan information identified at block 312 can be used to update fan operation settings associated with the fan. For example, received fan information (e.g., vendor information, model information, fan control information, desired settings) can be used to update how a fan is driven by a controller, such as updating how the PWM signals are sent to the fan.

At optional block 318, additional data that may have been extracted from the encoded signal can be transmitted and/or displayed. For example, additional data can contain a message that may be displayed on a computing system or otherwise presented to an administrator.

Figure 4:
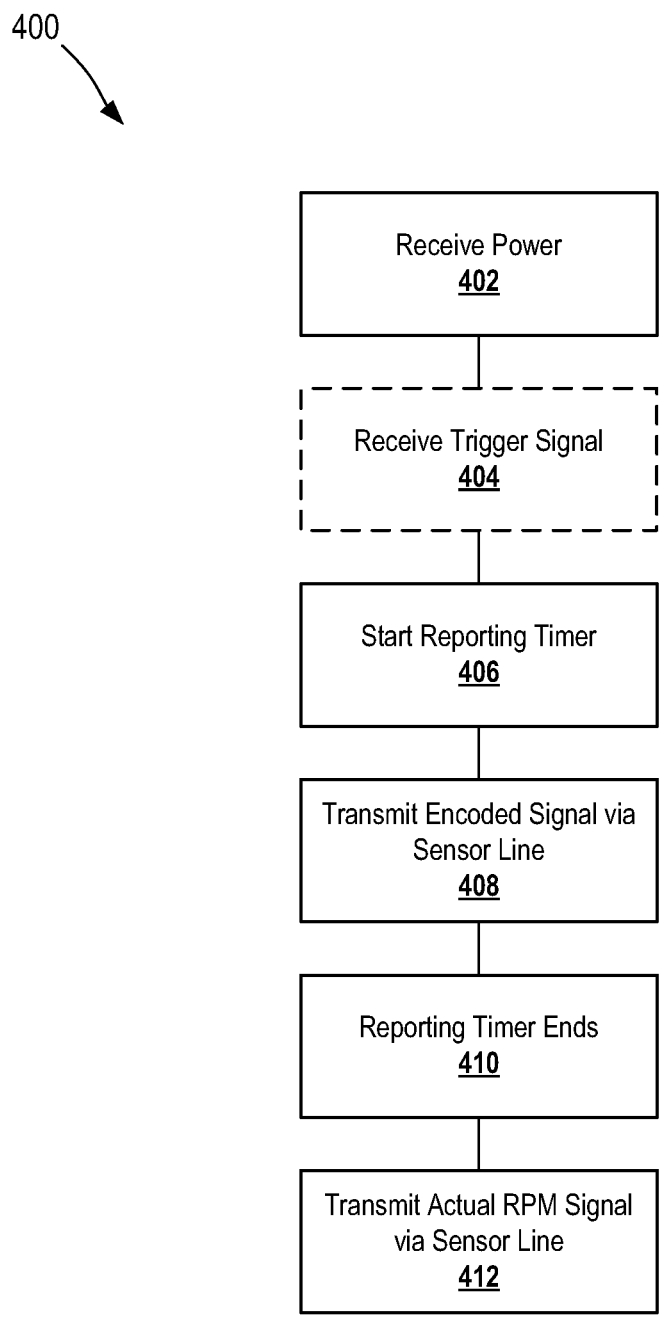
FIG. 4 is a flowchart depicting a process for transmitting an encoded signal for automatically identifying fan information, according to certain aspects of the present disclosure.

FIG. 4 is a flowchart depicting a process 400 for transmitting an encoded signal for automatically identifying fan information, according to certain aspects of the present disclosure. Process 400 can be performed by a fan, such as fans 104, 106, 108 of FIG. 1. More specifically, various portions of process 400 may be performed using the circuitry of the fan, such as circuits 124, 126, 128 of fans 104, 106, 108 of FIG. 1. At block 402, the fan can receive power. In some cases, the fan can optionally receive a trigger signal at block 404. The trigger signal can be received via a PWM control line.

At block 406, the fan can begin a reporting timer. The reporting timer can be preset to have a duration, which sets the duration of the broadcasting phase of the fan. At block 408, the fan can transmit an encoded signal via a sensor line. The encoded signal, when decoded, can be used to identify fan information and/or convey additional data associated with the fan. In some cases, the fan may generate the encoded signal based on an existing signal, however that need not always be the case. The encoded signal can be preset by the circuitry of the fan. At block 410, the reporting timer can end after the duration of the broadcasting phase has passed. After expiration of the reporting timer, the fan can stop transmitting the encoded signal and can begin transmitting an actual RPM signal at block 412. The actual RPM signal can be a signal sent via the sensor line of the fan that accurately represents the actual RPM of the fan.

In some cases, when a trigger signal is received at block 404, the broadcasting phase associated with blocks 406, 408, 410 can begin in response to receiving the trigger signal at block 404. In some cases, the broadcasting phase can begin in response to receiving power at block 402.

Figure 5:
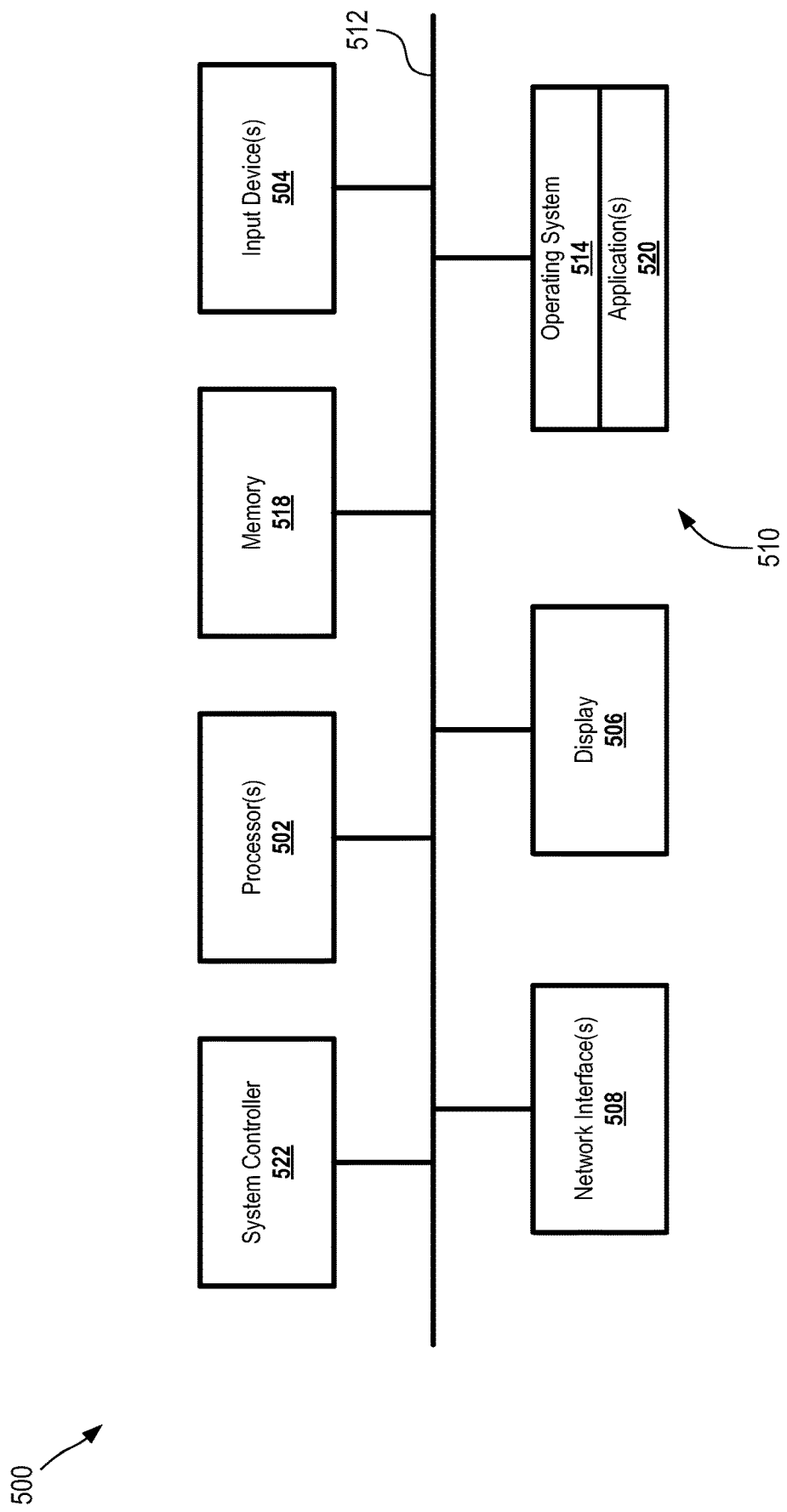
FIG. 5 is a block diagram of an example system architecture for implementing features and processes, according to certain aspects of the present disclosure.

FIG. 5 is a block diagram of an example system architecture for implementing features and processes of the present disclosure, such as those presented with reference to FIGS. 1-4. The architecture 500 can be implemented on any electronic device that runs software applications derived from compiled instructions, including without limitation, personal computers, servers, smart phones, media players, electronic tablets, game consoles, email devices, and the like. In some implementations, the architecture 500 can include one or more processors 502, one or more input devices 504, one or more display devices 506, one or more network interfaces 508, and one or more computer-readable mediums 510. Each of these components can be coupled by bus 512.

In some implementations, system architecture 500 can correspond to a single server in a rack of servers. Various rack configurations can be implemented. For example, a rack can include multiple chassis, and each chassis can contain multiple servers. Each server in the rack can be connected by various hardware components (e.g., backbone, middle plane, etc.).

Display device 506 can be any known display technology, including but not limited to display devices using Liquid Crystal Display (LCD) or Light Emitting Diode (LED) technology. Processor(s) 502 can use any known processor technology, including but not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions for implementing operating system 514 and applications 520 such as computer programs. The operating system can be multi-user, multiprocessing, multitasking, multithreading, real-time, and the like. The operating system 514 performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Computer-readable medium 510 can include various instructions for implementing firmware processes, such as a BIOS. Computer-readable medium 510 can include various instructions for implementing process 300 of FIG. 3.

Memory 518 can include high-speed random access memory and/or non-volatile memory, such as one or more magnetic disk storage devices, one or more optical storage devices, and/or flash memory (e.g., NAND, NOR). The memory 518 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 518 can store an operating system, such as Darwin, RTXC, LINUX, UNIX, OS X, WINDOWS, or an embedded operating system such as VxWorks.

System controller 522 can be a service processor that operates independently of processor 502. In some implementations, system controller 522 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters, and operating system (OS) functions.

In some implementations, the BMC runs independently of processor 502 and hence in the event of processor 502, memory 518 or any other hardware failure, the BMC can still provide services and remain functional. In some implementations, the BMC can start running as soon as a server is plugged into a power source (e.g., power supply unit, backup power unit, power distribution unit, etc.). For example, the power button on the front side of the blade does not turn on/off the BMC.

The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server; or that includes a middleware component, such as an application server or an Internet server; or that includes a front-end component, such as a client computer having a graphical user interface or an Internet browser; or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application, the capabilities of a device running the application, such as input capability, output capability, processing capability, power capability, communications capability, and the like.

The foregoing description of the embodiments, including illustrated embodiments, has been presented only for the purpose of illustration and description, and is not intended to be exhaustive or limiting to the precise forms disclosed. Numerous modifications, adaptations, and uses thereof will be apparent to those skilled in the art.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method, comprising:
supplying power to a cooling device of a computing system, the cooling device comprising a rotatable component, an encoding circuit, and a tachometer signal line for reporting information associated with the speed of rotation of the rotatable component;
receiving an encoded signal from the cooling device via the tachometer signal line, during a preset broadcasting phase, wherein the encoded signal includes cooling device identification information;
receiving a signal of the speed of rotation of the rotatable component from the tachometer signal line during a reporting phase following the broadcasting phase; and
obtaining cooling device identification information based on the received encoded signal.

2. The method of claim 1, wherein the encoded signal comprises false tachometer data that is not based on the speed of rotation of the rotatable component.

3. The method of claim 1, wherein obtaining cooling device identification information based on the received encoded signal comprises:
accessing an encoding schema; and
determining the cooling device identification information by decoding the encoded signal using the encoding schema.

4. The method of claim 1, further comprising adjusting one or more settings associated with operation of the cooling device based on the cooling device identification information.

5. The method of claim 1, further comprising transmitting a trigger signal to the cooling device, wherein the trigger signal, when received by the cooling device, initiates transmission of the encoded signal.

6. The method of claim 1, wherein the cooling device identification information comprises vendor identification of the cooling device.

7. A system, comprising:
a chassis;
a cooling device installed within the chassis, the cooling device comprising a rotatable component and a tachometer signal line for reporting information associated with the speed of rotation of the rotatable component;
one or more data processors coupled to the cooling device; and
a non-transitory computer-readable storage medium containing instructions which, when executed by the one or more data processors, causes the one or more data processors to perform operations including:
receiving an encoded signal from an encoding circuit of the cooling device via the tachometer signal line, during a preset broadcasting phase, wherein the encoded signal includes cooling device identification information;
receiving a signal of the speed of rotation of the rotatable component from the tachometer via the tachometer signal during a reporting phase following the broadcasting phase; and
obtaining cooling device identification information based on the received encoded signal.

8. The system of claim 7, wherein the encoded signal comprises false tachometer data that is not based on the speed of rotation of the rotatable component.

9. The system of claim 7, wherein obtaining cooling device identification information based on the received encoded signal comprises:
accessing an encoding schema; and
determining the cooling device identification information by decoding the encoded signal using the encoding schema.

10. The system of claim 7, further comprising adjusting one or more settings associated with operation of the cooling device based on the cooling device identification information.

11. The system of claim 7, further comprising transmitting a trigger signal to the cooling device, wherein the trigger signal, when received by the cooling device, initiates transmission of the encoded signal.

12. The system of claim 7, wherein the cooling device identification information comprises vendor identification of the cooling device.

13. A method, comprising:
receiving power at a cooling device of a computing system, the cooling device comprising a rotatable component, an encoding circuit, and a tachometer signal line for reporting information associated with the speed of rotation of the rotatable component;
outputting an encoded signal generated by the encoding circuit via the tachometer signal line, during a preset broadcasting phase, wherein the encoded signal includes cooling device identification information, and wherein the encoded signal, when received, is decodable to determine identification information associated with the cooling device; and
receiving a signal of the speed of rotation of the rotatable component from the tachometer via the tachometer signal during a reporting phase following the broadcasting phase.

14. The method of claim 13, wherein the encoded signal comprises false tachometer data that is not based on the speed of rotation of the rotatable component.

15. The method of claim 13, wherein the encoded signal is associated with a preset encoding schema such that the encoded signal is decodable using the preset encoding schema to determine the identification information associated with the cooling device.

16. The method of claim 13, further comprising receiving a trigger signal, wherein outputting the encoded signal occurs in response to receiving the trigger signal.

17. The method of claim 13, wherein the identification information associated with the cooling device comprises vendor identification of the cooling device.

* * * * *